United States Patent
Edgeller et al.

[11] Patent Number: 6,053,563
[45] Date of Patent: Apr. 25, 2000

[54] ENCLOSURE HAVING INTEGRALLY MOLDED PROTRUSIONS FOR SECURING SYSTEM COMPONENTS

[75] Inventors: Peter Edgeller, Southport; Jamie R. Wilson, Blackpool, both of United Kingdom

[73] Assignee: Ingersoll-Rand Company, Woodcliff Lake, N.J.

[21] Appl. No.: 09/267,995

[22] Filed: Mar. 15, 1999

[51] Int. Cl.⁷ ........................................................ B60J 7/00
[52] U.S. Cl. .......................... 296/181; 296/24.1; 296/901; 248/671; 248/678; 410/90; 410/91; 410/94
[58] Field of Search ..................................... 296/168, 181, 296/173, 24.1, 39.3, 901, 37.14, 37.1; 280/204; 180/69.24; 410/90, 91, 94, 95, 9, 19, 30; 248/671, 673, 678

[56] References Cited

U.S. PATENT DOCUMENTS

| | | | |
|---|---|---|---|
| 3,618,795 | 11/1971 | Burch | 410/68 |
| 3,762,340 | 10/1973 | Udaloff | 410/94 |
| 4,044,692 | 8/1977 | Cruthis et al. | 410/19 |
| 4,305,695 | 12/1981 | Zachrich . | |
| 4,372,568 | 2/1983 | Campbell | 280/63 |
| 4,416,483 | 11/1983 | Koch . | |
| 4,771,971 | 9/1988 | Ludwig et al. | 244/158 R |
| 4,805,859 | 2/1989 | Hudson | 248/148 |
| 4,982,971 | 1/1991 | Marin | 280/30 |
| 5,054,668 | 10/1991 | Ricchiuti . | |
| 5,129,700 | 7/1992 | Trevisan et al. . | |
| 5,131,709 | 7/1992 | Spica . | |
| 5,167,433 | 12/1992 | Ryan . | |
| 5,181,760 | 1/1993 | Muno | 296/181 |
| 5,205,602 | 4/1993 | Hoare et al. . | |
| 5,503,449 | 4/1996 | Cameron et al. . | |
| 5,535,931 | 7/1996 | Barlow et al. . | |
| 5,549,428 | 8/1996 | Yeatts | 410/94 |
| 5,593,259 | 1/1997 | Kuo | 410/3 |
| 5,653,494 | 8/1997 | Cleall et al. | 296/168 |

*Primary Examiner*—D. Glenn Dayoan
*Assistant Examiner*—Patricia Engle
*Attorney, Agent, or Firm*—Michael M. Gnibus

[57] ABSTRACT

An enclosure for holding a machine includes a lower body made of polymer materials, such as polyolafins and/or nylon. The lower body includes an interior region having a surface with one or more features integrally molded therein and an upper body overlying the lower body for enclosing the machine between the upper and lower bodies. The one or more features integrally molded into the surface of the interior region are adapted for at least partially securing the machine to the lower body. In one embodiment, the one or more features integrally molded into the surface of the lower body include a projection extending above the surface of the interior region and the machine includes a recess formed in a bottom surface thereof. The projection may be sized and shaped to fit within the recess for securing the machine to the surface of the lower body so as to prevent the machine from moving laterally with respect to the surface of the interior region.

19 Claims, 6 Drawing Sheets

ENCLOSURE HAVING INTEGRALLY MOLDED PROTRUSIONS FOR SECURING SYSTEM COMPONENTS

The present application claims benefit under 35 U.S.C. Section 119 of United Kingdom Patent Application Serial No. 9816273.8, filed Jul. 24, 1998. The present application is also related to U.S. patent application Ser. No. 09/175,268, filed Oct. 20, 1998, the disclosure of which is incorporated by reference herein. The '268 U.S. application also claimed benefit of the above-mentioned U.K. Patent Application Serial No. 9816273.8.

BACKGROUND OF THE INVENTION

1. Field of the Invention

The present invention relates to devices and methods for securing a machine to a body and more specifically relates to a trailer assembly having a polymer body with one or more features integrally molded into the body for securing a machine, such as a portable air compressor, thereto.

2. Description of the Prior Art

Portable air compressor systems generally include an air compressor mounted upon a trailer and having a protective enclosure or cover secured over the top of the compressor. The trailer may include wheels and a tow bar so that the trailer may be easily moved between job sites. Upon arriving at a job site, the air compressor may be operated to provide compressed air for pneumatic tools and other devices.

One such trailer for housing a portable air compressor is disclosed in commonly owned U.S. Pat. No. 5,518,262. The trailer includes a lower frame having two wheels rotatably mounted thereto and a towing assembly mounted to a front end of the lower frame for towing the compressor between job sites. A machine, such as an air compressor, is secured atop the lower frame. The compressor is preferably rigidly secured to the lower frame so that the compressor is not damaged as it is moved between job sites. Thus, the compressor and its associated components are typically bolted and/or welded to the lower body.

There are a number of other patents directed toward securing components within or atop the frame of a trailer or vehicle. For example, U.S. Pat. No. 5,129,700 to Travisan et al. discloses a floor pan that forms an interior, bottom surface of a vehicle. The floor pan is provided with attachment devices for fixing the floor pan to the frame of the vehicle. Mechanical parts and assemblies can be secured to the floor pan to form a single unit prior to the floor pan being installed on the frame.

U.S. Pat. No. 5,205,602 discloses a removable motor vehicle boot insert that may be installed within the trunk of a vehicle. The boot has a major surface including retainers for releasably anchoring a container to the major surface thereof. The retainers for releasably securing the container to the insert include a screw having an enlarged head defining a cam surface and an extension defining a handle for turning the screw. The cam surface of the screw head engages in a groove in opposed end walls of the container to anchor the container in a desired position on the insert.

U.S. Pat. No. 5,503,449 discloses a bed liner adapted for insertion in the cargo box of a trailer or utility hauling vehicle. The bed liner is formed of plastic and includes a plurality of sets of right- and left-hand, axially aligned notches elevated above a floor of the bed liner with each set being adapted for receiving opposite end portions of an axle of a greens mower. The aligned notches support the greens mower so that a rear roller and a bed knife are elevated above the floor while a front roller is resting on the floor.

Although the above-identified patents disclose various designs for securing components to a mobile structure, there remains a need for an improved mobile structure at least partially comprising polymer materials with one or more features integrally molded into the polymer materials, the molded features effectively securing one or more components to the body of the structure.

SUMMARY OF THE INVENTION

In accordance with certain preferred embodiments of the present invention, an enclosure for a machine, such as a portable air compressor, includes a lower body made at least partially of polymer materials. The enclosure also preferably includes an upper body overlying the lower body for containing the machine between the upper body and the lower body. The upper body may be secured to the lower body, such as being hingedly secured to the lower body. The lower body may comprise materials selected from the group consisting of polyolafins and nylon. The upper body preferably includes a material selected from the group consisting of acrylonitrile butadiene styrene (ABS), polycarbonate and polyolafins. The upper and lower bodies may be formed using a molding process. In other embodiments, the upper body may be formed using a vacuum molding process.

The upper body may have a coefficient of thermal expansion that differs from the coefficient of thermal expansion of the lower body. In certain preferred embodiments, the lower body includes an alignment channel molded into a top portion thereof for receiving one or more bottom edges of the upper body. The alignment channel serves to align the upper body with the lower body during opening and closing of the enclosure. The alignment channel may also enhance the structural integrity of the trailer by providing lateral support for the bottom edges of the upper body so as to prevent the collapse and/or deformation of the upper body. The channel preferably has sufficient width to capture the bottom edge of the upper body as a wide range of operating temperatures, thus providing tolerance for misalignment between the upper and lower body components. This alignment feature is particularly important in view of the fact that the upper and lower bodies may comprise different materials having different coefficients of thermal expansion, as mentioned above.

In preferred embodiments, the lower body has at least one wheel, and more preferably two or more wheels, rotatably mounted thereto for moving the enclosure over a surface. The enclosure may also include a towing element attached thereto for pulling or towing the enclosure. The towing element includes a tow bar connected to the lower body and projecting from a front end thereof. The tow bar may be adjustable for modifying the height of the front end of the lower body above the surface. The lower body preferably includes an interior region having a surface of polymer material with one or more surface features, such as projections, integrally molded therein. In one preferred embodiment, the one or more features integrally molded into the surface of the lower body include a projection extending above the surface of the interior region. In this embodiment, the machine includes a recess formed in a bottom surface thereof. The projection molded into the surface of the lower body is sized and shaped to fit within the recess of the machine for securing the machine to the surface of the lower body. The relatively close engagement of the recess with the molded projection holds the machine in place and prevents the machine from moving laterally with respect to the surface of the lower body. The recess may include interior walls defining the perimeter of the recess and the projection may include outer walls engaging the interior walls of the recess for securing the machine to the lower body. In other preferred embodiments, the machine may have an outer surface and the projection formed in the surface of the lower body includes a wall adapted for engaging the outer surface of the machine so as to prevent the machine from moving laterally with respect to the surface of the interior region. The wall for engaging the outer surface of the machine surrounds a mounting area at the surface of the lower body, the machine being adapted for overlying the mounting area. The enclosure may also include a securing element, such as a strap or band, overlying at least a portion of the machine and connected to the lower body for preventing the machine from moving in directions substantially vertical with respect to the surface of the interior region.

The use of polymer materials for the enclosure, as opposed to using heavier metal materials, significantly reduces the overall weight of the enclosure. In certain preferred embodiments, the enclosure including the portable machine has an overall weight of approximately 375–425 kilograms. Thus, smaller vehicles than ordinarily required for conventional portable machine trailers may be utilized to tow the relatively lightweight enclosure of the present invention.

Other objects, advantages and features of the present invention will be readily apparent to one skilled in the art from the following detailed description of preferred embodiments when taken in conjunction with the accompanying drawings showing certain preferred embodiments of the present invention.

DETAILED DESCRIPTION OF PREFERRED EMBODIMENTS

Figure 1:
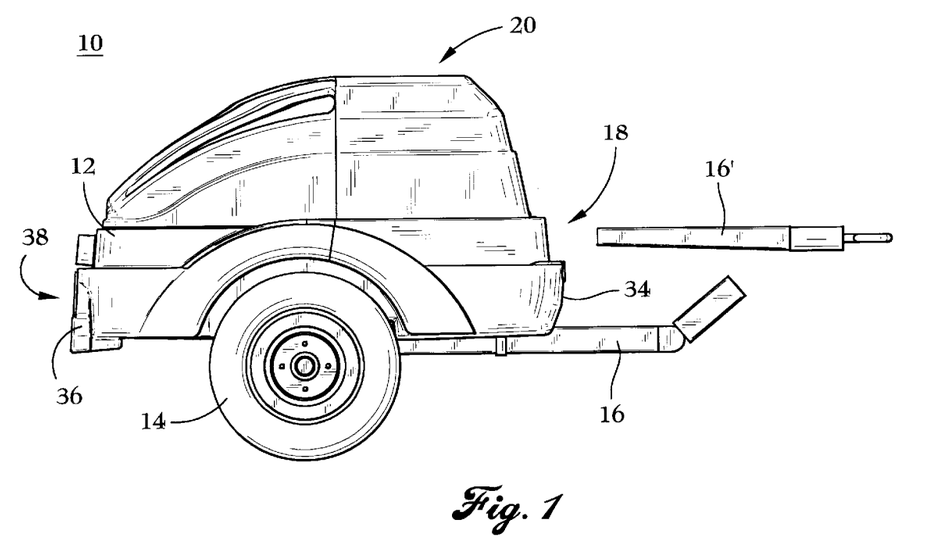
FIG. 1 shows a side view of an enclosure for a portable machine including a lower body, an upper body and a towing element, in accordance with one preferred embodiment of the present invention.
Figure 2:
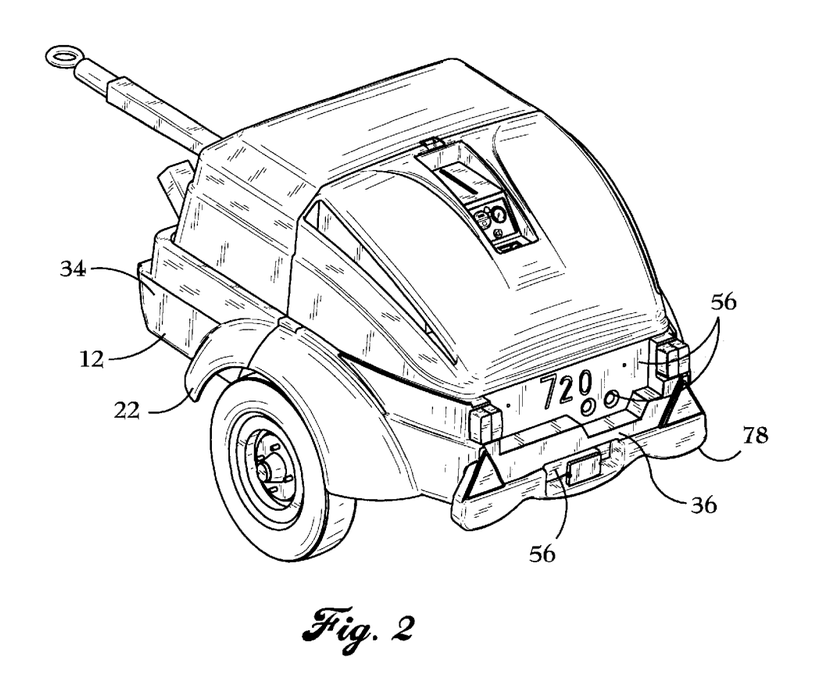
FIG. 2 shows a rear perspective view of the enclosure of FIG. 1.

FIGS. 1 and 2 show side and perspective views of an enclosure for a machine in accordance with certain preferred embodiments of the present invention. The enclosure generally comprises a trailer 10 including a lower body portion 12 having wheels 14 rotatably mounted thereto. The lower body portion 12 includes a tow bar 16 secured to the trailer 10 and projecting from a front end 18 thereof for towing the trailer. The tow bar 16 is capable of being adjusted so as to modify the height of the tow bar above the ground. In other embodiments, the tow bar may include a flat version 16' having a fixed height. The lower body portion 12 preferably comprises a polymer, such as a high-density polyethylene. In other preferred embodiments, the lower body portion 12 may include other moldable materials, such as a medium density polyethylene or nylon. The trailer 10 also includes an upper body 20 that also preferably comprises a polymer material. The upper body 20 may include acrylonitrile butadiene styrene (ABS), a polymer material having a different coefficient of thermal expansion than the lower body 12. The upper body may also include polycarbonate and/or polyolafins. In one preferred embodiment, the upper body 20 is molded using a vacuum molding process. The utilization of polymer materials for the trailer 10 enhances sound attenuation due to the natural ability of polymers to muffle sound. As is well known to those skilled in the art, polymers muffle sounds more efficiently than metals because they have a less dense molecular structure.

The lower body portion 12 includes a stylized external design having rounded edges, corners and fenders 22. The rounded shape of the lower body 12 portion provides a more aerodynamic structure that has a more aesthetically pleasing look and feel. In addition, the generally rounded design is safer because it is devoid of the sharp edges typically present in metal trailers. As such, the rounded design of the trailer 12 improves the overall performance and safety of the portable trailer.

The tear drop shape of the trailer generates favorable airflow patterns when the trailer is being towed, thereby enhancing stability. Moreover, the use of polymer materials for the trailer, as opposed to metal, reduces the overall weight of the trailer. In certain preferred embodiments, the trailer comprising polymer materials has an overall weight of between approximately 375–425 kilograms, or about 20% lighter than prior art trailers using metal. As a result, smaller vehicles may be used to tow the lighter weight trailers disclosed herein. In addition, the reduced weight of the trailer allows the trailer to be towed at greater speeds and improves overall stability.

Figures 3A, 3B:
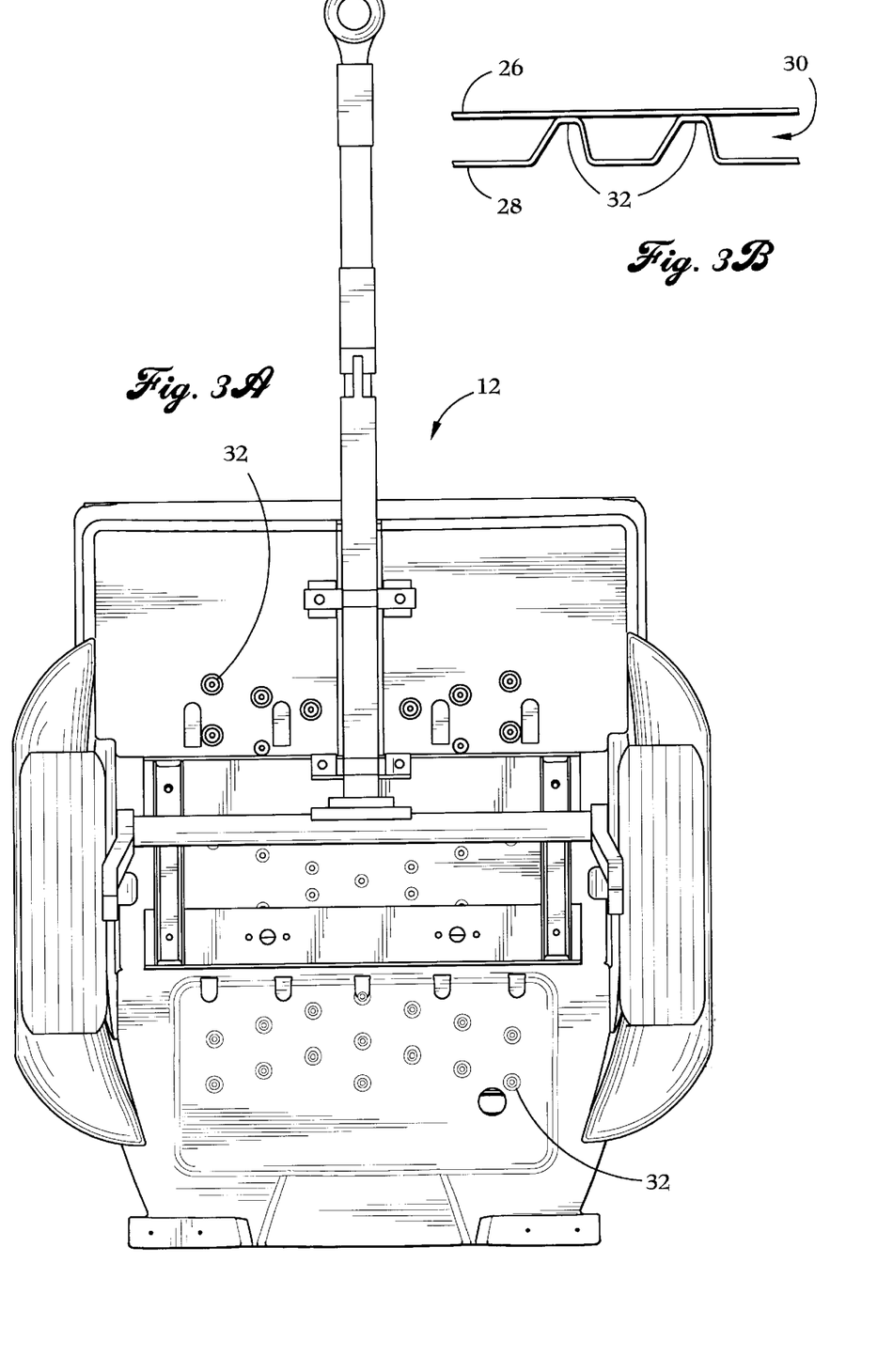
FIG. 3A shows a bottom view of the enclosure of FIG. 1.
FIG. 3B shows a fragmentary cross sectional view of the lower body including an inner skin, an outer skin, and an air gap between the inner and outer skins for muffling sound generated during operation of the portable machine, in accordance with certain preferred embodiments of the present invention.

Referring to FIGS. 3A and 3B, the lower body portion 12 includes an inner skin 26 and an outer skin 28. The space 30 between the inner and outer skins 26 and 28 is preferably filled by air, also referred to as an air gap, which generally muffles and/or attenuates the sounds produced by the air compressor and the engine. The air gap is preferably between approximately 30–90 mm and, in one particular embodiment, is more preferably between about 30–40 mm. In other preferred embodiments, the air gap may be filled by insulating material such as foam, rubber, or any commonly used insulation materials. In certain preferred embodiments, selected portions of the inner and outer skins are in permanent contact with one another so as to minimize unwanted movement and vibration of the skins. These selected sections of the inner and outer skins 26 and 28 are preferably molded together to provide integrated supports 32. A rotational molding process may accomplish this. During the rotational molding process, selected portions of the outer skin 28 are forced in an upward direction toward the inner skin 26 so that the outer skins are shaped as conical portions and secured to the inner skin to provide the integrated supports 32. The integrated supports 32 enhance the structural integrity of the design by damping vibrational movement of the inner and outer skins of the lower body portion.

Figure 4:
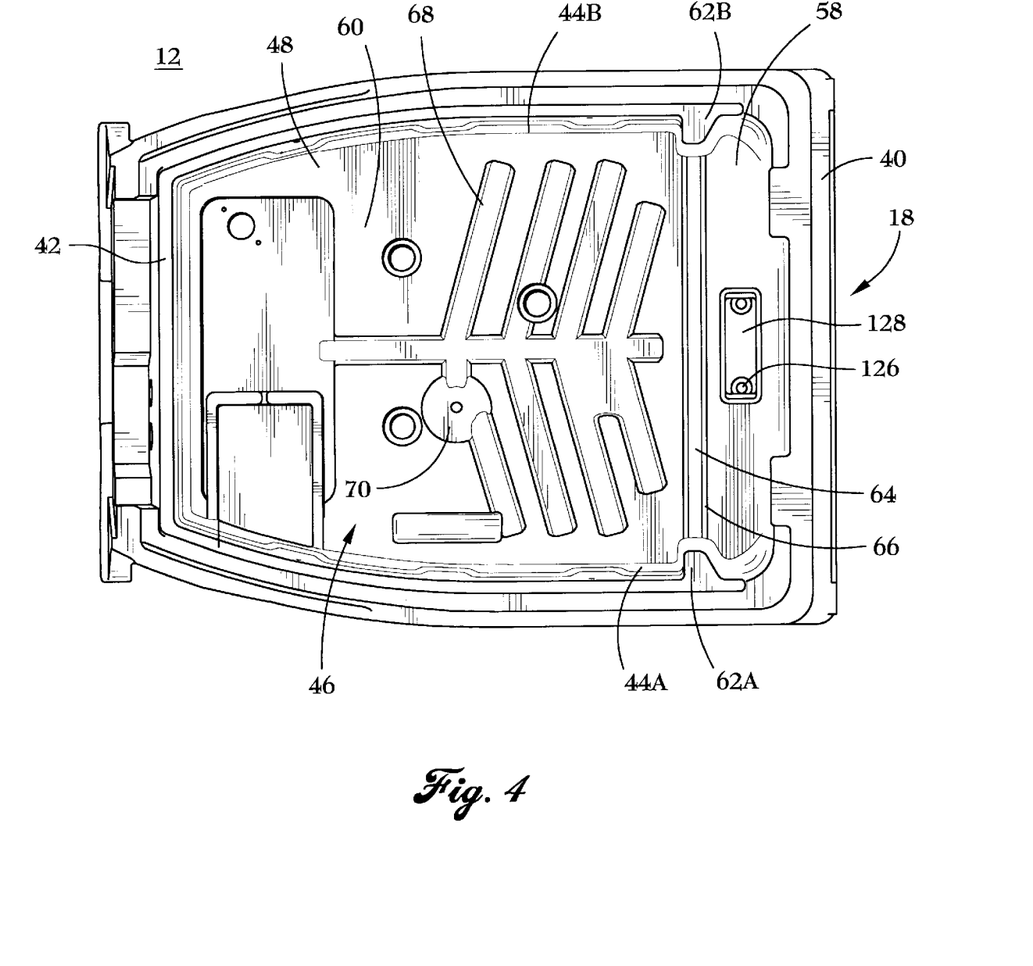
FIG. 4 shows a top view of the lower body of FIG. 1, in accordance with certain preferred embodiments of the present invention.
Figure 5:
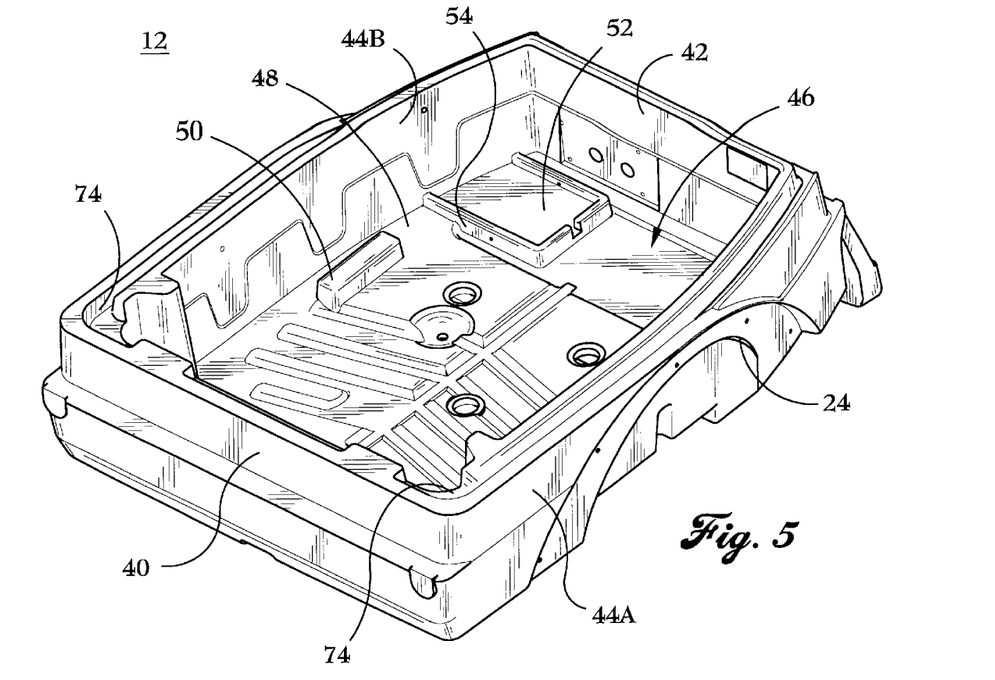
FIG. 5 shows a perspective side view of the lower body of FIG. 1, in accordance with certain preferred embodiments of the present invention.
Figure 7:
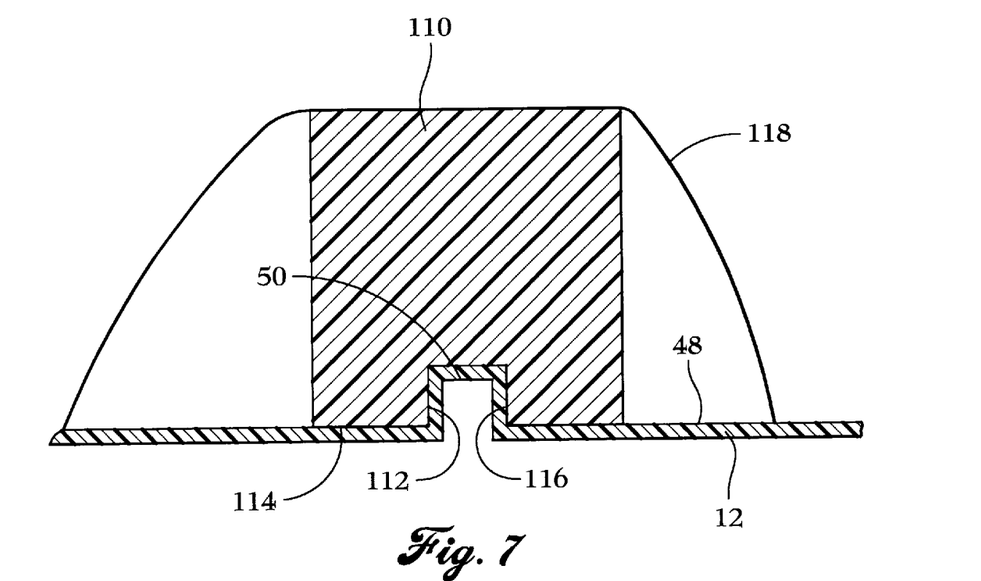
FIG. 7 shows a cross-sectional view of a projecting feature integrally molded into the lower body of the enclosure with a machine component secured atop the molded projection, in accordance with certain preferred embodiments of the present invention.

Referring to FIGS. 4 and 5, the lower body includes four side walls designated front wall 40, rear wall 42, and sides walls 44A and 44B, which define an interior region 46 thereof adapted for securing items such as an air compressor, an engine, a fuel tank, a battery, an oil cooler and/or a radiator therein. Referring to FIGS. 5 and 7, in one particular embodiment, a fuel tank 110 having a recess 112 formed in a bottom surface 114 thereof is secured to the lower body 12. The floor 48 of the interior region 46 includes a projection or key 50 integrally molded therein which is sized and shaped to fit within the recess 112 formed in the bottom surface 114 of the fuel tank 110. The recess 112 includes interior walls 116 that define the perimeter of the recess 112. In preferred embodiments, the outer dimensions or periphery of the projection 50 substantially engage the interior walls 116 of the recess 112 in the fuel tank 110 so that the fuel tank 110 fits snugly over the projection 50. The projection 50 integrally molded in the floor 48 of the lower body 12 and the recess 112 cooperatively secure the fuel tank 110 from moving in lateral directions, i.e. along the X and Y axes. A securing element 118, such as a retaining strap, may be placed over the top of the fuel tank 110 and secured to the lower body 12 for preventing the fuel tank 110 from moving in substantially vertical directions (i.e., z-axis) with respect to the floor 48 of the lower body 12.

Figure 8:
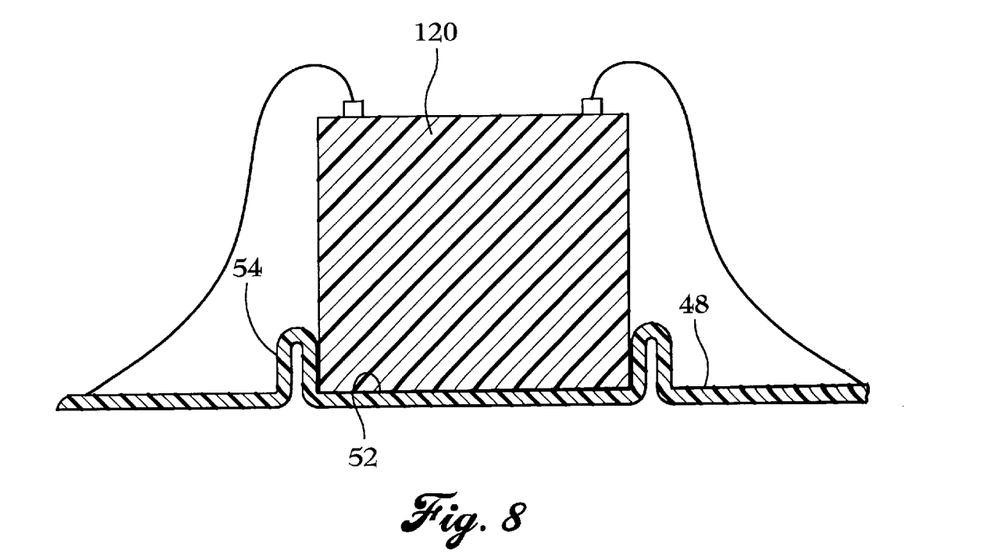
FIG. 8 shows a cross-sectional view of a retaining wall integrally molded into the lower body of the enclosure, the retaining wall surrounding a mounting area with a machine component secured over the mounting area, in accordance with certain preferred embodiments of the present invention.

Referring to FIGS. 5 and 8, the lower body 12 also has a battery mounting area 52 molded into the floor 48 thereof. A retaining wall 54 is integrally molded into the lower body 12 and surrounds the battery mounting area 52. The retaining wall 54 surrounds a battery 120 and prevents the battery from moving in lateral directions. Although the fuel tank 110 (FIG. 7), an air compressor (not shown), the battery 120 (FIG. 8) and other components may be in direct contact with the floor 48 of the lower body 12, the polymer materials of the lower body will not deform during operation of the air compressor because the maximum operating temperature of the various components is less than the melting temperature of the polymer materials.

Figure 6:
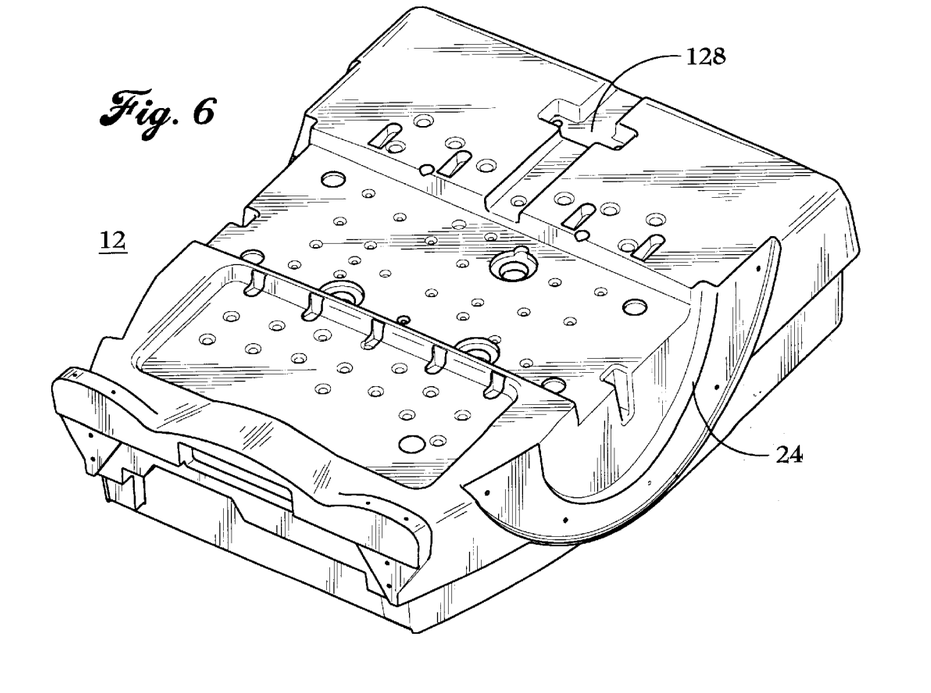
FIG. 6 shows a perspective bottom view of the lower body of FIG. 5.
Figure 9:
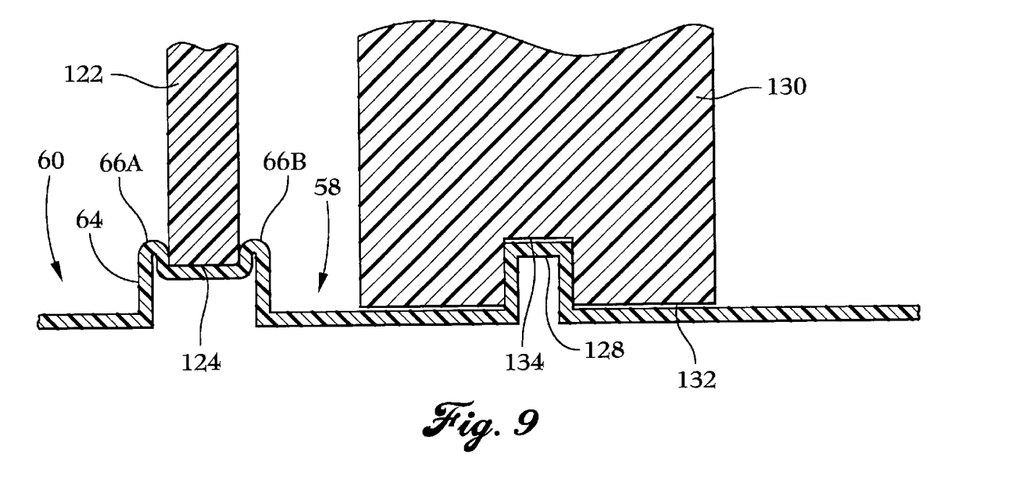
FIG. 9 shows a cross-sectional view of projections molded into the lower body including a dividing wall for separating sections of the lower body, in accordance with certain preferred embodiments of the present invention.

Referring to FIGS. 4, 6 and 9, the lower body 12 is preferably divided into an oil and water cooler area 58 and an engine compartment area 60. In certain embodiments, the oil and water cooler area 58 and the engine compartment 60 are divided by a separating wall 122. The separating wall 122 is secured in place by projections 62A and 62B that are molded into opposing side walls 44A and 44B of the lower body 12, preferably adjacent the front end 18 thereof. The lower body 12 may also have fluid barrier 64 formed therein that extends between the opposing projections 62A and 62B. The fluid barrier 64 preferably includes one or more raised flanges 66A and 66B that abut adjacent a bottom edge 124 of the dividing wall 122 for preventing fluids from passing between the oil and water cooler area 58 and the engine compartment 60.

Referring to FIG. 4, the lower body may also include one or more drainage holes 126 provided in the floor of the lower body 12, between the fluid barrier 64 and the front end 18 of the trailer. The drainage holes 126 draw rain water and/or any other fluids, such as cooling fluids, away from the engine compartment 60 and discharge the fluids from the trailer. Referring to FIGS. 4, 6 and 9, the oil and water cooler area 58 may also have a projection 128 integrally molded therein for supporting another component of the machine system, such as a radiator 130. In the embodiment shown in FIG. 9, the radiator 130 has a bottom surface 132 with a recess 134 formed therein that is sized and shaped to fit closely over the projection 128. The projection 128 performs a similar function to the projection shown and described above in FIG. 7.

Figure 10:
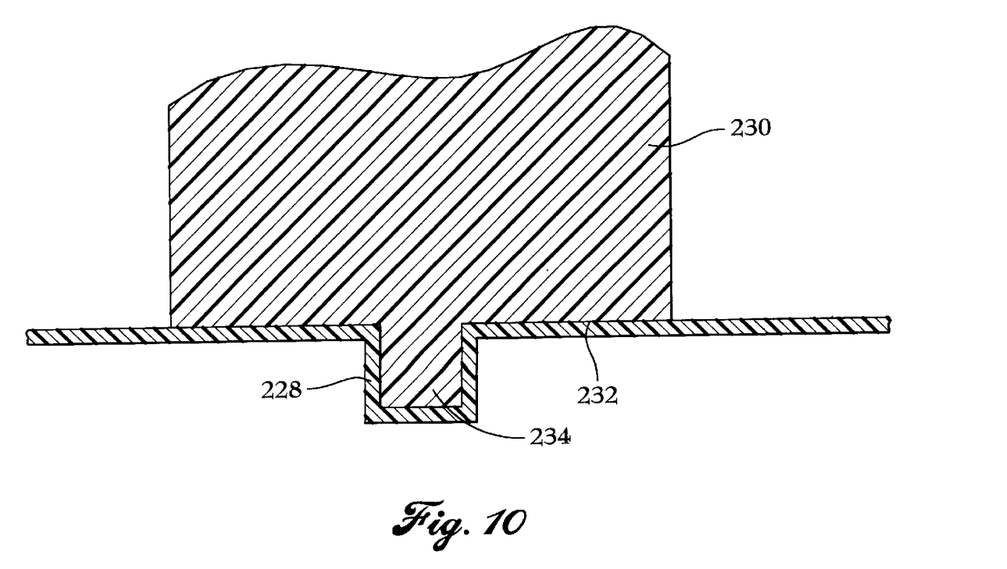
FIG. 10 shows a cross-sectional view of a depression integrally molded into the lower body of the enclosure with a machine component having a projection sized to fit within the depression, in accordance with certain preferred embodiments of the present invention.

Referring to FIG. 10, in yet other preferred embodiments, the features integrally molded into the lower body may include a depression 228 and a component of the machine, such as a radiator 230, may have a projection 234 sized to fit snugly within the depression 228 for holding the component 230 in place.

It will therefore be readily understood by those skilled in the art that the present invention may be used for a broad array of functions and applications and that many embodiments and adaptations of the present invention, other than those described herein, will be apparent from or reasonably suggested by the foregoing description without departing from the substance or scope of the present invention. For example, the enclosure disclosed herein may be utilized for portable light towers, portable generators or portable compressors. Accordingly, while the present invention has been described in relation to its preferred embodiment, it is to be understood that this disclosure is only illustrative and exemplary of the present invention and is made merely for purposes of providing a full and enabling disclosure. The foregoing is not intended or to be construed to limit the present invention or otherwise to exclude any such other embodiments, adaptations, variations, modifications and equivalent arrangements.

What is claimed is:

1. An enclosure for a machine having a number of machine components, the enclosure comprising:

a lower body having a lower body coefficient of thermal expansion, said lower body comprising polymer materials, said lower body including an interior region having a surface with one or more features integrally molded therein; and an upper body having an upper body coefficient of thermal expansion, said upper body overlying said lower body for containing said machine between said upper and lower bodies, wherein the one or more features integrally molded into the surface of the interior region are adapted for at least partially securing one or more components of said machine to said lower body, wherein said upper body has a different coefficient of thermal expansion than said lower body.

2. The enclosure as claimed in claim 1, wherein said one or more features integrally molded into the surface of said lower body includes a projection extending above the surface of said interior region.

3. The enclosure as claimed in claim 2, wherein said machine includes a recess formed in a bottom surface thereof and said projection is sized and shaped to fit within the recess for securing the one of said components of machine to the surface of said lower body so as to prevent said machine from moving laterally with respect to the surface of the interior region.

4. The enclosure as claimed in claim 3, wherein the recess includes interior walls defining the perimeter thereof, said projection including outer walls engaging the interior walls of said recess for securing the one of said components of said machine.

5. The enclosure as claimed in claim 3, further comprising a securing element overlying at least a portion of the machine and connected to the lower body for preventing said machine from moving in directions substantially vertical with respect to the surface of the interior region.

6. The enclosure as claimed in claim 2, wherein said machine has a machine component with an outer surface and said projection includes a wall adapted for engaging the outer surface of said machine component so as to prevent said machine from moving laterally with respect to the surface of the interior region.

7. The enclosure as claimed in claim 6, wherein said wall for engaging the outer surface of said machine component surrounds a mounting area at the surface of said lower body, said machine being adapted for overlying said mounting area.

8. The enclosure as claimed in claim 7, further comprising a securing element overlying at least a portion of the machine and connected to the lower body for preventing said machine from moving in directions substantially vertical with respect to the surface of the interior region.

9. The enclosure as claimed in claim 1, further comprising:

at least one wheel rotatably mounted to said lower body; and a towing element attached to the lower body for pulling said enclosure over a surface.

10. The enclosure as claimed in claim 9, wherein said towing element includes a tow bar connected to the lower body and projecting from a front end thereof.

11. The enclosure as claimed in claim 10, wherein said tow bar is adjustable for modifying the height of the front end of the lower body above the surface.

12. The enclosure as claimed in claim 1, wherein said lower body comprises materials selected from the group consisting of polyolafins and nylon.

13. The enclosure as claimed in claim 1, wherein said upper body includes a material selected from the group consisting of acrylonitrile butadiene styrene (ABS), polycarbonate and polyolafins.

14. The enclosure as claimed in claim 1, wherein said one or more features integrally molded into the surface of said lower body includes a depression extending below the surface of said interior region.

15. The enclosure as claimed in claim 14, wherein said machine includes a projection formed at a surface thereof, said projection being sized and shaped to fit within the recess for securing one of said components of the machine to the surface of said lower body so as to prevent said machine from moving laterally with respect to the surface of the interior region.

16. The enclosure as claimed in claim 1, wherein said upper and lower bodies are formed using a molding process.

17. The enclosure as claimed in claim 1, wherein said upper body is formed using a vacuum molding process.

18. The enclosure as claimed in claim 1, wherein said upper body is secured to said lower body.

19. The enclosure as claimed in claim 18, wherein said upper body is hingedly secured to said lower body.

* * * * *

UNITED STATES PATENT AND TRADEMARK OFFICE
CERTIFICATE OF CORRECTION

PATENT NO.   : 6,053,563
DATED        : April 25, 2000
INVENTOR(S)  : Peter EDGELLER *et al.*

It is certified that error appears in the above-identified patent and that said Letters Patent is hereby corrected as shown below:

On Front Cover, under "Foreign Application Priority Data" please add

--[30] Foreign Application Priority Data
July 24, 1998    [UK] United Kingdom......................9816273.8--.

Signed and Sealed this

Twenty-seventh Day of February, 2001

Attest:

NICHOLAS P. GODICI

Attesting Officer    *Acting Director of the United States Patent and Trademark Office*